United States Patent [19]

Takahashi et al.

[11] Patent Number: 5,549,430

[45] Date of Patent: Aug. 27, 1996

[54] SELF-ATTACHING FASTENER AND INSTALLATION DIE

[75] Inventors: Takao Takahashi, Machida; Niroshi Takehara, Hachioji, both of Japan

[73] Assignee: Multifastener Corporation, Detroit, Mich.

[21] Appl. No.: 285,201

[22] Filed: Aug. 3, 1994

Related U.S. Application Data

[63] Continuation-in-part of Ser. No. 11,439, Jan. 29, 1993, Pat. No. 5,340,251.

[30] Foreign Application Priority Data

| | | | |
|---|---|---|---|
| Jan. 31, 1992 | [JP] | Japan | 4-45997 |
| Jan. 31, 1992 | [JP] | Japan | 4-45998 |
| Feb. 25, 1994 | [JP] | Japan | 6-051022 |

[51] Int. Cl.⁶ .......................... F16B 37/04; B23P 11/00
[52] U.S. Cl. .................... 411/179; 411/180; 29/432.2; 29/525.05
[58] Field of Search .................... 411/177, 179, 411/180, 181; 29/432.1, 432.2, 525.1, 525.2, 525.05, 525.06

[56] References Cited

U.S. PATENT DOCUMENTS

| | | | |
|---|---|---|---|
| Re. 15,413 | 7/1922 | Reynolds. | |
| 1,648,026 | 11/1927 | Murray. | |
| 3,234,987 | 2/1966 | Hentzi. | |
| 3,253,631 | 5/1966 | Reusser. | |
| 3,282,315 | 11/1966 | Zahodiakin. | |
| 3,299,500 | 1/1967 | Double | 29/432.2 |
| 3,337,946 | 8/1967 | Anderson et al. | 29/432.1 |
| 3,648,747 | 3/1972 | Steward. | |
| 3,810,291 | 5/1974 | Ladouceur. | |
| 3,878,599 | 4/1975 | Ladouceur et al. | 29/432.2 |
| 4,690,599 | 9/1987 | Shinjo | 411/180 |
| 4,708,556 | 11/1987 | Parner et al. | 411/180 X |

FOREIGN PATENT DOCUMENTS

| | | |
|---|---|---|
| 2607562 | 6/1988 | France. |
| 109710 | of 1958 | Japan. |
| 25049 | of 1990 | Japan. |

*Primary Examiner*—Neill R. Wilson
*Attorney, Agent, or Firm*—Howard & Howard

[57] ABSTRACT

A self-clinching nut fastener, which may be used as a pierce nut, having a central cylindrical pilot portion, an annular flange portion surrounding the pilot portion, having a generally flat annular panel-supporting end face and an annular groove defined in the flange end face surrounding the pilot. The bottom wall of the groove includes a projecting convex annular protuberance which extends circumferentially around the pilot and radially from the pilot to a midportion of the groove bottom wall spaced from the groove outer wall and the groove outer wall is inclined inwardly toward the pilot to define a restricted opening to the annular groove. The installation apparatus includes a die button having a projecting annular clinching lip configured to be received within the nut groove. The method of installation includes locating a panel on the die button lip with the die button lip coaxially aligned with the nut groove, then driving the nut against the panel to deform an annular portion of the panel into the nut groove and against the annular protuberance to deform the panel portion beneath the inclined outer groove wall and preferably radially inwardly against the pilot portion. In the most preferred embodiment, the protuberance comprises a plurality of semi-circular protuberances which are integral with the pilot portion and extend radially to beyond the radial center of the grooved bottom wall and the panel is deformed against the groove bottom wall into radial channels between the spaced protuberances preventing relative rotation of the nut on the panel.

20 Claims, 1 Drawing Sheet

SELF-ATTACHING FASTENER AND INSTALLATION DIE

RELATED APPLICATIONS

This application claims priority to Japanese patent application 6(1994)-051022 filed Feb. 25, 1994 and this application is a continuation in part application of U.S. application Ser. No. 08/011,439, filed Jan. 29, 1993 now U.S. Pat. No. 5,340,251, which claims priority to two Japanese patent applications 1992-45997 and 1992-45998, both filed Jan. 31, 1992.

This invention relates to self-attaching fasteners, such as clinch and pierce nuts, utilized in mass production applications, the method of installing such fasteners and the resultant nut and panel assembly.

BACKGROUND OF THE INVENTION

Self-clinching nuts and pierce nuts of the type disclosed herein generally include a projecting central pilot portion, which may be used to pierce a metal panel or plate to which the fastener is to be attached and the pilot portion is then received through the pierced panel opening. The nut is then attached to the metal panel by a die member which forms a mechanical interlock between the nut and the panel. The panel may be deformed by the die member into grooves in the nut or the nut may be deformed to entrap panel metal.

Many pierce nuts are used by the automotive industry to assemble cars in which many components of various kinds are attached to metal plates or panels. Pierce nuts are used to attach lamps and sheet metal parts, for example, to the vehicle. When such parts are attached, screws or bolts are threaded into the threaded hole in the nut and a bolt or screw is tightened with rotating tools, such as a torque wrench, at prescribed torque values. The clinch nut must therefore have sufficient anti-torque or rotation resistance (the force that keeps the pierce nut from rotating on the metal plate when a bolt is threaded into the nut and tightened) to bind it to the metal panel. After a component is attached to the clinch nut on a metal plate, external forces, such as vibration and tensile forces applied to the automobile, act upon the nuts from the pull-through direction attempting to pull the nuts from the metal plate to which they are attached. Therefore, each clinch nut must have sufficient pull-through resistance (the force that keeps the nut from coming out of the metal plate when the nut and a bolt are engaged and the force is applied to the bolt perpendicular to the metal plate) that is stronger than these external forces.

As stated, the torque value of the rotating tool or torque wrench is predetermined, such that the rotational resistance of the clinch nut in the panel should be sufficient to resist this torque value, but the external forces applied to the automobile often cannot be forecast. Therefore, the aforementioned pull-through resistance must be relatively high.

When pierce or clinch nuts are being driven into metal plates, the pierce nuts are supplied to the installation tooling continuously through an outlet of a supply device, such as a hopper. Thus, it would be preferred if the shape of the pierce or clinch nut permits free variance of the attachment direction on the surface of the metal plate. In other words, the shape of the pierce nut should permit free variation of the direction that each pierce nut emerges from the outlet of the hopper. In cases in which pierce nuts are to be driven into a metal panel in a number of locations, the pierce nuts should be shaped so that the direction of the pierce nut outlet can be freely varied to suit the installation operation.

Further, in the automotive industry, which utilizes many pierce nuts, there is a trend toward thinner metal panels or plates to reduce the weight of each car. Thus, it is necessary to have pierce or clinch nuts shaped to provide the necessary rotation resistance and greater pull-out and pull-through resistance, even when used on thin metal plates. When, for example, it is necessary to achieve pull-out resistance in excess of 200 kg. and sufficient rotation resistance to withstand the tightening torque when applied by a torque wrench with a 0.6 mm. plate and the bolt or screw meets resistance during engagement of the nut, existing pierce nuts of the type described above cannot consistently satisfy these requirements.

As described above, a pierce or clinch nut is typically attached to a metal panel or plate in conjunction with an installation die commonly referred to as a die button. The die button includes one or more projecting lips or protrusions configured to be received in the nut groove or grooves. When the pierce or clinch nut has an annular groove, the die button includes an annular lip or protrusion configured to be received in the annular groove of the nut. When the self-attaching nut is a pierce nut, the die button typically includes a shearing edge or surface which cooperates with an outside surface of the pilot portion of the pierce nut to pierce an opening in the panel. The pierce nut pilot is then received through the pierced panel opening and the lip or protrusion of the die button then deforms the panel into interlocking relation with the nut groove or grooves. However, as described above, this mechanical interlock must be sufficient to withstand the torque which may be applied to the nut when a bolt is cross-threaded in the nut and tightened and the nut must have sufficient pull-out and pull-through resistance for commercial applications.

With existing die buttons, the material around the pierced panel opening is deformed by the two surfaces formed by the cylindrical outer surface of the circular lip or protrusion on the die button and the annular die face that is perpendicular to this outer surface and by the outside wall of the annular groove in the pierce nut when the panel metal is deformed into the annular groove. Thus, when insufficient panel metal is deformed by the annular lip of the die button, insufficient panel metal is inserted into the groove and it is not possible to increase the mechanical interlock between the panel metal and the groove to achieve the required pull-out strength. When the panel or plate is particularly thin, the volume of panel metal deformed in the groove is insufficient and the nut falls off the plate.

Certain problems developed with the manufacture and installation of the embodiments of the self-attaching nut disclosed in the above-identified U.S. parent application, Ser. No. 011,439. As will be understood by those skilled in the art, the forming punch used to form the annular groove of the self-attaching nut has an annular lip which conforms to the shape of the bottom of the groove. In the embodiments disclosed, the die lip includes an end face having depressions conforming to the shape of the protuberances, which are aligned in the midportion of the bottom wall of the groove. However, when forming oil adheres to the depressions in the end of the forming punch, the oil cannot escape during formation of the groove. This results in resistance and incomplete forming of the protuberances; however, the protuberances are essential to radial deformation of the metal panel during installation as described in the above-identified parent application. Thus, the pierce nuts disclosed in the above-identified parent patent application does not provide sufficient retention or torque resistance on the panel using conventional forming techniques.

Further, the wall of the pilot portion in the embodiment disclosed in the parent application is very thin at the bottom of the groove because the groove inner wall is inclined outwardly. As described in the above-identified parent application, during installation of the nut in a panel, the panel metal is deformed radially inwardly and driven against the inner portion of the annular wall of the pilot, which may result in distortion of the female thread in the nut bore. This has resulted in binding of the screw or bolt as it is threaded into the nut bore following installation of the nut.

Finally, the projecting annular lip of the die button used to install the nut must be relatively thin at the tip as the lip includes an outer annular concave filet which forms the panel metal in the groove as described in the above-referenced parent patent application. This results in weakening of the annular lip and shortened die button life, which is not acceptable, particularly in mass production applications. Thus, there was a need for improvement of the design of the embodiments of the self-attaching fastener disclosed in the above-referenced parent patent application.

The improved self-attaching nut fastener disclosed in this application significantly improves the life of the die button and permits the full formation of the protuberances using conventional forming techniques, thus improving the manufacturing and installation processes of the pierce nut. Further, the self-clenching fastener or pierce nut may be reliably attached to a thin metal panel or plate providing sufficient pull-out strength and rotational resistance without distortion of the threads in the nut bore.

SUMMARY OF THE INVENTION

Self-attaching fasteners of the type disclosed herein are generally used to pierce a hole in the metal panel or plate and the nut is then attached to the panel by a die button, as described. However, as will be understood by persons skilled in the art, the pierce nut of this invention may also be used as a clinch nut, wherein the nut is installed in a panel having a pre-formed panel opening or hole. The fastener of this invention is self-clinching; that is, the nut fastener includes an annular groove and the panel is deformed in the groove to form a mechanical interlock between the panel and the fastener. A self-piercing fastener, however, has several important advantages, particularly in mass production applications. For the description of the invention, therefore, the self-attaching fastener of this invention will sometimes be referred to as a pierce nut. The nut may be formed of steel, such as cold formable 1010 steel.

As described, the self-attaching nut fastener of this invention is particularly adapted for attachment to a plastically deformable metal panel, generally steel. The fastener includes a central pilot portion, a flange portion preferably surrounding the pilot portion having a generally flat annular panel supporting end face and an annular groove defined in the flange portion end face preferably surrounding the pilot. The groove includes opposed inner and outer side walls and a bottom wall. In the preferred embodiment of this invention, the outer surface of the nut is generally round and the annular wall defining the pilot is cylindrical, including a cylindrical outer surface which defines the inner surface of the annular groove. The outer groove wall is inclined inwardly toward the pilot or includes an inclined portion to define a restricted or "re-entrant" opening to the groove bottom wall, preferably adjacent the flange and face. The bottom wall of the self-attaching nut fastener of this invention includes a convex projecting annular protuberance extending at least partially around the pilot. The radially outer surface of the protuberance is opposed to and spaced from the inclined outer groove side wall and preferably the protuberance is integral with the inner side groove wall or outer surface of the pilot, thereby strengthening the pilot and preventing deformation of the female thread in the nut bore. In the most preferred embodiment, the annular protuberance extends from the inner groove wall to a midportion of the groove bottom wall spaced from the groove outer wall. The cylindrical outer surface of the pilot portion, which in part defines the inner groove wall, permits the use of a forming punch having a thicker annular forming lip and the elimination of a space between the protuberance and the inner groove wall eliminates the requirement for depressions or pockets in the end of the forming punch, thereby substantially improving punch life because forming oil is not entrapped in the pockets.

During installation of the nut on a metal panel, as described herein, panel metal is deformed against the protuberance by the annular lip of the die button; the protuberance then deforms panel metal radially outwardly beneath the inclined outer groove wall, forming a secure installation. In the most preferred embodiment, the protuberance comprises a plurality of circumferentially spaced protuberances, each of which extend circumferentially around the pilot and radially from the inner wall of the groove to adjacent a midportion of the groove bottom wall. In the most preferred circular form of the nut, the protuberances are semi-circular. In the disclosed embodiment, the protuberances are wedge-shaped, each having a smaller circumferential width adjacent the pilot. Thus, the sides of the protuberances are not exactly "radial," but the protuberances extend radially. As the panel metal is then deformed into the groove, the panel metal is also deformed into radial channels between the semi-circular protuberances and between the radial arcuate ends of the protuberances against the bottom wall and beneath the inclined portion of the grooved outer wall, forming a very secure installation and preventing rotation of the nut on the panel. In the preferred embodiment, the protuberances extend radially from the pilot portion beyond the radial center of the groove bottom wall to define a restricted space between the radial outer extent of the protuberances and the inclined portion of the groove outer wall. The bottom wall of the groove also preferably includes an annular bridging portion integral with the pilot outer surface and the adjacent protuberances further strengthening the annular pilot wall. The annular bridging portions have a radial width substantially less than the protuberances. The protuberances preferably have a generally flat top surface facing the groove opening and may include an arcuate radial outer surface extending from the top surface toward the groove bottom wall; however, the radial surface is not required.

The resultant nut fastener and panel assembly of this invention thus includes the self-clinching nut fastener described and a plastically deformable metal panel. The panel includes an opening, which is cylindrical in the preferred embodiment, which receives the end of the pilot portion therethrough, which is spaced above the plane of the annular panel-supporting surface of the flange portion. The panel metal is deformed in the annular groove of the nut fastener against the groove bottom wall and beneath the inclined portion of the groove outer wall. In the most preferred embodiment, the panel metal is also deformed against the groove inner wall or outer surface of the pilot, forming a very secure mechanical interlock between the panel and the nut fastener.

The method of this invention thus includes supporting the panel on a die member having a projecting annular lip portion. Where the nut is utilized to pierce the panel opening, the die member includes a central bore which receives the slug pierced from the panel. The nut fastener and the annular lip of the die member are then driven against the panel, deforming an annular portion of the panel surrounding the panel opening into the nut groove. The annular lip of the die member then deforms the radial portion of the panel against the annular protuberance, which thins the panel and deforms the panel portion radially outwardly beneath the inclined portion of the groove outer wall. The protuberance further deforms the panel metal radially inwardly against the groove inner wall. In the most preferred embodiment, which includes a plurality of circumferentially spaced generally annular protuberances, the panel metal is also deformed against the groove bottom wall into channels, between the spaced annular protuberances, providing a secure mechanical interlock and preventing rotation of the nut on the panel.

DESCRIPTION OF THE PREFERRED EMBODIMENTS

Figure 1:
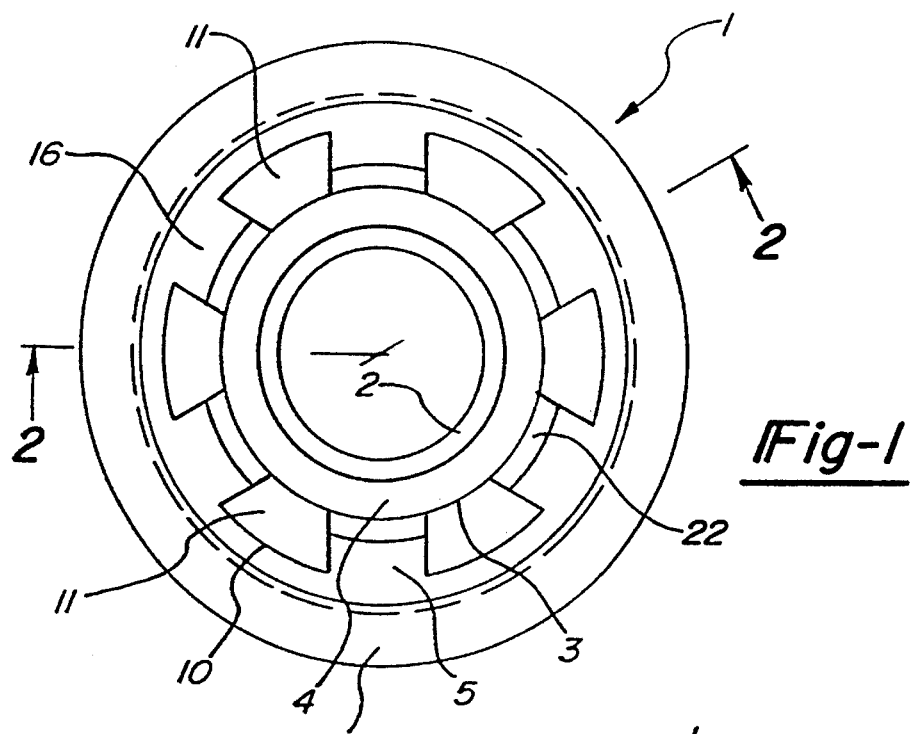
FIG. 1 is a top plan view of a preferred embodiment of the self-attaching nut of this invention.

As described above, the preferred embodiments of the self-attaching nut of this invention is a pierce nut 1 preferably having a generally circular or cylindrical shape such that the pierce nut may be fed to the installation tool or head, not shown, without requiring rotational orientation of the nut to the panel. The pierce nut may, however, be octagonal, polygonal or other annular shapes depending upon forming techniques and installation requirements. In the disclosed embodiment, the inner wall or pilot portion 4 includes a shearing or piercing edge 3 and a central screw hole or female threaded bore 2. The nut bore may also smooth to receive self-tapping or thread rolling screws. The cylindrical outer surface 8 of the pilot portion defines the inner wall of the annular groove 5 and the groove is further defined by the outer wall 6 and bottom wall 7.

As described above, the cylindrical outer surface 8 of the pilot is preferably parallel to the axis L of the nut and the threaded bore 2 and defines a continuation of the shearing or piercing edge 3. The annular outer wall 6 or flange portion includes a relatively flat annual panel supporting surface and an inclined conical surface 9 which tapers inwardly toward the pilot portion 4 to define a restricted or "re-entrance" groove having a narrower opening adjacent the panel supporting annual surface. The bottom wall 7 of the groove includes an annular protuberance 11 which extends radially outwardly from the outer surface 8 of the pilot portion to a midportion 10 of the groove bottom wall. In the most preferred embodiment, the protuberance 11 is integral with the pilot portion 4 strengthening the pilot portion as described above.

Further, as described above, the forming punch used to form the groove 5 includes an end portion which conforms to the shape of the protuberance 11 and the bottom wall 7. Because the protuberance 11 extends radially from the pilot portion 4 to a midportion 10 of the groove bottom wall, the end of the forming punch does not include recessed pockets as required for forming the centrally located protuberances disclosed in the above identified U.S. parent application of this application. Thus, no forming oil or debris remains on the end or tip of the forming punch which may cause incomplete forming of the protuberance. Even if forming oil clings to the forming punch, the oil flows along the cylindrical outer surface 8 of the pilot 4 onto the surface of the protuberance 11 and the oil is released to the outside along the surface 8 of the pilot and there is no resistance from the oil when the protuberance is formed. This assures accurate and complete forming of the protuberance 11.

Figure 2:
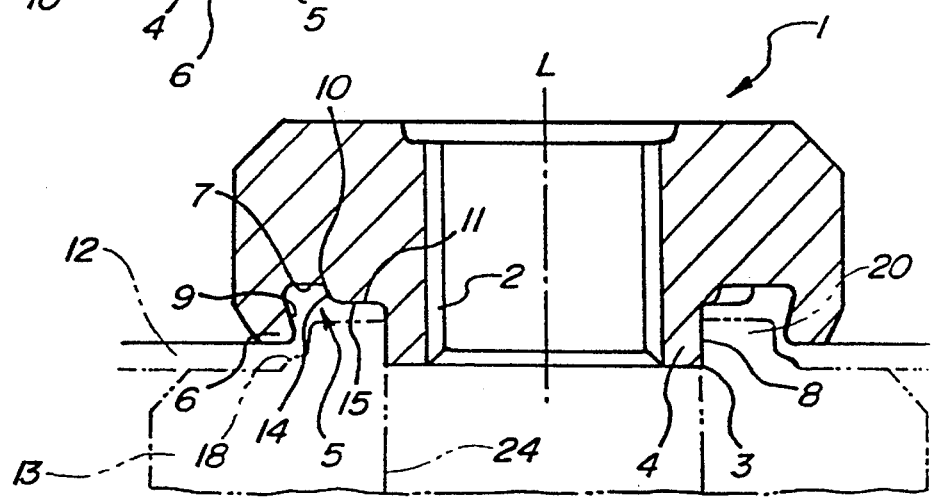
FIG. 2 is a cross-sectional view of the self-attaching nut shown in FIG. 1, in the direction of view arrows 2—2, illustrating a die button and method of installation.

The method of attaching the pierce nut 1 to a metal plate or panel is best shown in FIG. 2. The pierce nut is driven into the panel 12 by a reciprocating plunger in an installation head (not shown). The plunger drives the pierce nut parallel to the central axis L. Where the self-attaching nut 1 of this invention is utilized as a pierce nut, the panel is sheared or pierced between the piercing edge 3 of the nut and the 24 opening to the die button 3. As described, the die button 13 includes a central opening 24 which receives the slug pierced from the panel. The annular panel portion surrounding the panel opening is then deformed by the projecting annular lip 20 of the die button 13 into the annular groove 5 against the top surface 15 of the protuberance 11, which thins the annular panel portion and deforms the panel portion radially outwardly against the bottom wall 7 and beneath the inclined surface 9 of the flange portion 6 which defines the outer wall of the groove. Because the protuberance is adjacent more preferably integral with the pilot portion 4, it is possible in this embodiment to provide a relatively wide space on the bottom wall 7 between the radial outer extent of the protuberance 11 at 10 and the opposed inclined surface 9 of the outer wall of the groove. Further, as shown, the annular groove 5 is wider at the bottom wall 7 than adjacent the opening to the groove.

Thus, during installation of the nut on the panel, the panel metal is caused to flow radially outwardly into the enlarged space at the bottom of the groove 7 beneath the inclined surface 9 as best shown in FIG. 2. It should also be noted that the inside surface of the projection 20 is cylindrical and closely conforms to the cylindrical outer surface 8 of the pilot because the outer surface 8 is not inclined as disclosed in the above referenced parent application. The annular die button projection 20 is therefore thicker and more robust, significantly reducing die button breakage, as described above. Because the panel metal is deformed radially outwardly into the relatively wide outer bottom wall 7, sufficient pull resistance and rotational resistance can be obtained. The metal plate 12 may also be of varying thickness, including relatively thin panels (e.g. 0.6 mm) to thicker panels (e.g. 2.0 mm) using the same nut size and type and therefore the pierce nut 1 can be designed for common use in various panel thicknesses.

As described above, the die button 13 and particularly the annular projecting lip portion 20 is designed to attach the panel 12 to the pierce nut 1. The die button includes an annular fillet 18 at the peripheral side of the projecting annular lip. This fillet 18 assists in filling the groove with panel metal and is relative thick, such that the die button lip is not weakened, resulting in few instances where the life of the forming punch is shortened due to damage of the lip after long-term use of the die button 13.

Another advantage of the cylindrical outer surface 8 of the pilot 4 and the fact that this cylindrical surface 8 is parallel to the axis L of the nut is to provide a thicker wall for the pilot 4. Further, the panel metal is not deformed radially inwardly against the inside wall of the groove to the extent found with the pierce nut disclosed in the above referenced parent application where the protuberance is in the midportion of the groove bottom wall. It is important, however, to deform the panel metal in contact with the outer surface 8 of the pilot to ensure strong pull out resistance. In this embodiment, therefore, the female thread 2 in the nut bore is not deformed during installation of the nut on the panel.

In the disclosed embodiment of the pierce nut 1 shown in FIG. 2, the protuberance 11 includes a flat top surface 15 as shown in FIG. 2 and the protuberance includes an annular arcuate surface 14 at the upper radial outer extent of the protuberance at 10. This arcuate surface 14 assists in deforming the panel metal into the bottom wall 7 of the groove as the lip 20 of the die button 13 is driven into the groove and against the flat upper surface 11 of the protuberance. The arcuate surface 14 has been somewhat exaggerated for clarity and is not required to form a good installation.

In the most preferred embodiment, the protuberance 11 comprises a plurality of spaced arcuate or semi-circular protuberances wedge-shaped 11 as best shown in FIG. 1. The spaces 16 between the protuberances define channels which provide anti-rotation means for the nut when installed on a panel. That is, the annular portion of the panel which is driven into the groove 5 against the protuberances 11 and the bottom wall 7 is also driven against the bottom wall into the spaces 16 between the protuberances. The bottom wall 7, including the radial channels or spaces 16 between the protuberances, is generally flat. Further, in the disclosed embodiment, the nut includes a plurality of arcuate or semi-circular bridging portions 22 which are integral with the cylindrical outer surface 8 of the pilot portion 4 and the adjacent semi-circular protuberances 11; however, the radial width of the bridging portions 22 is substantially less than the radial width of the protuberances 11 as shown in FIG. 1. The bridging portions may be of the same height (measured from the bottom wall 7) as the protuberances 11, as shown in FIG. 2. The bridging portions 22 further increase the structural rigidity of the wall which defines the pilot portion 4, thus further reducing the likelihood of deformation of the pilot during installation of the nut on a panel. By increasing the height of the protuberances 11 and the number of spaces 16 between the protuberances, the rotational resistance of the nut on the panel can be increased even more. These areas of discontinuity or channel-shaped spaces 16 are not limited to six places as long as there are multiple spaces between the protuberances and usually between four and six spaces are suitable.

Figure 3:
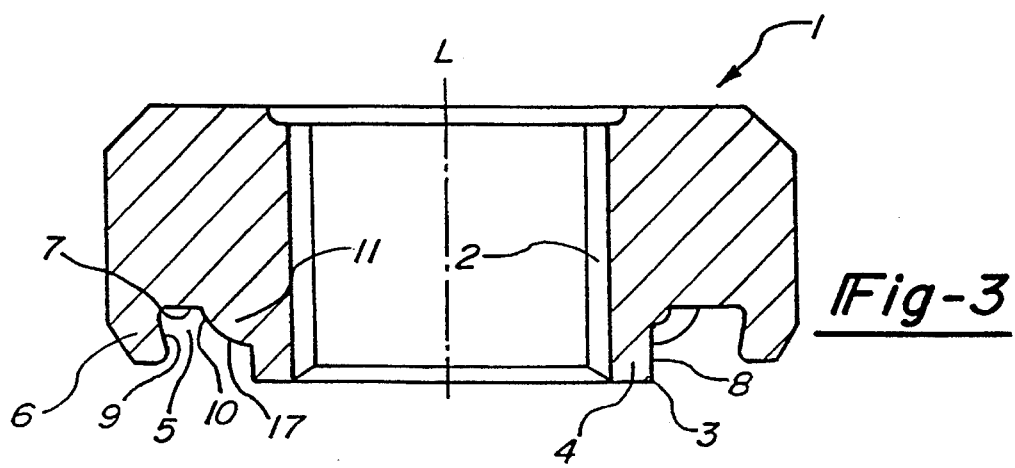
FIG. 3 is a cross-sectional view of another embodiment of the self-attaching nut of this invention in the direction of view arrows 2—2 in FIG. 1.

FIG. 3 illustrates another embodiment of the pierce nut of the present invention. Except for the shape of the protuberances 11 in the embodiment shown in FIG. 3, the remaining formation and substance is the same; therefore, the numbering is applied and further explanation is omitted. In the embodiment shown in FIG. 3, the protuberances 17 are circular in cross section and extend from the bottom wall 7 at a midportion 10 to the cylindrical side surface 8 of the wall 4 which defines the pilot portion. A nut and panel assembly utilizing the nut shown in FIG. 3 will result in deformation of an annular portion surrounding the panel hole into the nut groove, as described above, wherein the arcuate or circular protuberance causes the metal to flow easily into the comparatively wide bottom wall 7 between the inclined or tapered outer wall surface 9 of the flange portion 6 and the protuberance 11.

The method of installing the self-attaching nut 1 of this invention then includes locating the panel 12 on the die button 13 and orienting the nut 1 opposite the panel and die button with the nut annular groove 5 coaxially aligned with the projecting lip 20 of the die button. As described above, the nut is normally fed through conventional chuting or the like to an installation head having a reciprocal plunger, not shown, wherein the nut is accurately aligned in the plunger passage opposite the die button. The nut 1 is then driven against the panel 12 by a plunger (not shown) and the annular panel portion surrounding the aperture or hole in the panel is then driven into the nut groove 5 by the projecting annular lip 20 of the die button 13. Where the nut is used as a pierce nut, the panel is first pierced by the piercing or shearing edge 3 in cooperation with the edge of the die button adjacent the upper surface of the projecting annular lip and the hole 24 through the die button. As described, the self-attaching nut 1 may also be installed as a clinch nut, wherein the panel opening is first pierced by a punch and the nut is then installed in the panel opening, resulting in the same panel assembly shown. The annular panel portion is then driven by the annular lip 20 of the die button 13 against the upper surface 15 of the protuberance 11 and the panel is thinned and deformed radially outwardly against the groove bottom wall 7 and beneath the inclined surface 9 of the flange portion 6. As will be understood, this description assumes that the nut moves relative to the panel. Alternatively, the nut and panel may be held in place and the die button driven into the panel to perform the same installation sequence described. In either case, there is relative movement and the process will thus be described as the nut moving relative to the panel.

The self-attaching nut, nut and panel assembly and method of installation of this invention therefore achieves the desired advantages over the prior art and provides further improvements over the pierce nut disclosed in the above referenced U.S. parent application. The modification of the protuberance from the midportion of the bottom wall to a protuberance 11 which extends radially from the inner pilot wall 8 to a midportion 10 of the groove and a cylindrical outer wall 8, eliminates entrapment of forming oils and debris from the end of the forming punch, such that the forming oil flows along the outer surface 8 where it is released along this surface and provides no resistance to complete forming of the protuberance. Thus, accurate forming of the protuberance 11 can be achieved and the nut 1 can be fastened on a panel to provide ample pull and rotational resistance. Further, the tapered configuration of the flange portion 6 provides an inclined surface 9 which is narrower at the tip, such that the panel metal is made to flow from the protuberance 11 to the bottom wall 7 and simultaneously outwardly to and beneath the inclined outer wall 9, providing sufficient pull and rotational resistance.

Moreover, a cylindrical outer surface 8 of the pilot 4, which is parallel to the nut axis L, eliminates radially inwardly directed deformation forces as the panel is deformed in the groove, which could deform the female thread 2 in the nut bore. Deformation of the threaded bore is also lessened by increasing the width 7 of the bottom wall of the groove 5 between the radial outer extent 10 of the protuberance 11 and the outer inclined surface 9 of the nut groove 5. Further, locating the protuberance at or adjacent the inner wall 8 provides a wider surface 7 for the bottom wall, providing greater pull resistance and enabling the use of a relatively thick annular projection 20 on the die button 13, improving die life and reducing die breakage. Finally, providing a plurality of channel-shaped spaces 16 between the protuberances 11 provides for improved torque resistance, wherein the panel metal is deformed against the bottom wall at 16 into the radial channels between the adjacent protuberances 11. As will be understood, further modifications may be made to the disclosed self-attaching nut fastener, method of installation and the resultant nut and panel assembly within the purview of the appended clams. As described, the shape or configuration of the protuberances and the number of protuberances and spaces between the protuberances may be modified for particular applications.

We claim:

1. A self-attaching nut fastener for attachment to a plastically deformable metal panel, said fastener having a central pilot portion, a flange portion generally surrounding said pilot portion having a generally flat annular panel-supporting end face, and an annular groove defined in said flange end face surrounding said pilot, said groove having opposed inner and outer side walls and a bottom wall, said outer groove side wall generally inclined towards said pilot to define a restricted opening to said groove bottom wall, said groove bottom wall including a plurality of spaced protuberances, said protuberances extending circumferentially around said pilot and radially outwardly from adjacent said pilot to a midportion of said groove bottom wall, spaced from said groove outer wall, to direct panel metal radially outwardly beneath said inclined groove outer wall as said panel is deformed in said groove against said bottom wall as said nut fastener is attached to said panel.

2. The self-attaching nut fastener defined in claim 1, characterized in that said protuberances are integral with an outer surface of said pilot which defines said groove inner wall and extending radially to beyond the radial center of said groove bottom wall.

3. The self-attaching nut fastener defined in claim 2, characterized in that said groove bottom wall includes an annular bridging portion integral with said pilot outer surface and adjacent protuberances, said bridging portion having a radial width substantially less than said protuberances.

4. The self-attaching nut fastener defined in claim 1, characterized in that the outer surface of said pilot is cylindrical and said cylindrical outer pilot surface defines said groove inner wall, and said protuberances being wedge-shaped, generally semi-circular, each having a longer outer circumferential end surface opposite said groove outer wall than adjacent said pilot.

5. A self-attaching fastener for attachment to a plastically deformable metal panel, said fastener having a central pilot portion, a flange portion generally surrounding said pilot portion having a generally flat annular panel-supporting end face, and an annular groove defined in said flange portion end face generally surrounding said pilot, said pilot portion having an end face spaced above the plane of said flange portion end face and a generally cylindrical outer side face defining an inner wall of said groove, said groove having a bottom wall and an outer side wall generally inclined towards said pilot to define a restricted annular opening to said groove bottom wall, said groove bottom wall having an protuberance integral with said pilot outer side face extending circumferentially around said pilot and radially from said pilot to a midportion of said groove bottom wall spaced from said groove outer wall, said protuberance directing panel metal beneath said inclined groove outer side wall as said panel is deformed in said groove against said bottom wall as said nut fastener is attached to said panel.

6. The self-attaching fastener defined in claim 5, characterized in that said protuberance includes a generally flat top surface facing said groove opening and an arcuate radial outer surface extending from said top surface toward said groove bottom wall.

7. The self-attaching fastener defined in claim 5, characterized in that said protuberance includes a generally flat top surface facing said groove opening and a generally perpendicular radial outer surface facing said outer wall and extending from said top surface towards said groove bottom wall.

8. The self-attaching fastener defined in claim 7, characterized in that said protuberance comprises a plurality of spaced protuberances on said groove bottom wall extending circumferentially substantially around said pilot, said groove bottom wall between said protuberances and said groove outer wall being generally flat.

9. The self-attaching fastener defined in claim 8, characterized in that said protuberances are each generally semi-circular.

10. The self-attaching fastener defined in claim 8, characterized in that said protuberances are wedge-shaped, each have a longer arcuate outer radial end surface opposite said groove outer wall than the width of said protuberances adjacent said pilot.

11. A self-piercing and clinching nut fastener for attachment to a plastically deformable metal panel, said nut fastener having a central pilot portion, a flange portion generally surrounding said pilot portion having a generally flat annular panel-supporting end face, and an annular groove defined in said flange end face surrounding said pilot, said pilot portion having an end face spaced above said flange portion end face, a generally cylindrical outer side face defining an inner side wall of said groove and a piercing surface adjacent said pilot end and outer side faces, said groove having a bottom wall and an outer side wall generally inclined towards said pilot side face to define a restricted annular opening to said groove bottom wall, said groove bottom wall including a plurality of spaced protuberances, said protuberances each having a top face spaced above said bottom wall of said groove defining channels between said protuberances, and said protuberances extending radially outwardly from said pilot side face to a midportion of said groove bottom wall spaced from said groove outer wall to direct panel metal radially outwardly beneath said inclined groove outer wall as said panel is deformed in said groove, against said bottom wall and said channels, as said fastener is attached to said panel.

12. The self-piercing and clinching nut fastener defined in claim 11, characterized in that said flange portion includes a cylindrical radial outer face and said pilot portion includes a central threaded bore extending therethrough generally perpendicular to said end face.

13. The self-piercing and clinching nut fastener defined in claim 11, characterized in that said piercing surface comprises a relatively sharp edge defined at the intersection of said pilot cylindrical side face and said pilot end face.

14. The self-piercing and clinching nut fastener defined in claim 11, characterized in that said protuberances are semi-circular having a generally cylindrical end face opposite said groove outer side wall and said groove outer side wall is conical.

15. A nut fastener and panel assembly, including a plastically deformable metal panel and a self-clinching nut fastener, said nut fastener having a projecting central pilot portion including an end face and a central bore extending through said pilot generally perpendicular to said end face, a flange portion generally surrounding said pilot having an annular panel-supporting end face spaced below a plane of said pilot portion end face supporting an annular portion of said panel, an annular groove defined in said flange end face of said nut fastener adjacent to and generally surrounding said pilot, said groove having a bottom wall and opposed inner and outer side walls, said groove outer side wall including a portion inclined towards said pilot to define a restricted opening to said groove bottom wall, said groove bottom wall including a convex generally annular projecting protuberance extending circumferentially at least partially around said pilot and radially from adjacent said pilot to a midportion of said groove bottom wall spaced from said groove outer wall, and said panel having an opening receiving said pilot portion therethrough and said annular panel portion surrounding said panel opening deformed in said nut fastener annular groove against said groove bottom wall, and said panel annular portion deformed in said groove against said protuberance extending radially inwardly against said groove inner wall and radially outwardly against said groove outer wall beneath said inclined portion of said groove outer wall forming a secure mechanical interlock between said panel and said nut fastener.

16. The nut fastener and panel assembly defined in claim 15, characterized in that said annular protuberance comprises a plurality of spaced arcuate protuberances projecting from said groove bottom wall and said panel deformed against said bottom wall into radial channels between said protuberances preventing relative rotation of said nut fastener on said panel.

17. The nut fastener and panel assembly defined in claim 15, characterized in that said flange portion includes an arcuate surface extending from said flange portion annular end face to said groove outer side wall, said panel deformed around said flange portion arcuate surface against and beneath said groove outer side wall inclined surface.

18. A nut fastener and panel assembly, comprising a self-clinching nut fastener and a plastically deformable metal panel, said nut fastener including a central pilot portion, a flange portion generally surrounding said pilot portion having an annular panel-supporting end face, an annular groove defined in said flange end face generally surrounding said pilot, said pilot portion having an end face spaced above the plane of said flange portion end face and a generally cylindrical outer side face defining an inner side wall of said groove and said groove having a bottom wall and an outer side wall, said outer side wall including a portion inclined towards said pilot to define a restricted annular opening to said groove bottom wall, said groove bottom wall including a plurality of spaced projecting convex protuberances integral with said pilot outer side face extending circumferentially at least partially around said pilot and radially to a midportion of said groove bottom wall spaced from said groove outer wall, said panel having a first annular portion supported on said flange portion end face, an opening receiving said pilot portion therethrough and a second annular portion deformed in said nut fastener annular groove, said second annular panel portion deformed against said protuberances and said groove bottom wall and extending radially inwardly and outwardly against said pilot portion outer face and said groove bottom wall beneath said inclined portion respectively, forming a secure mechanical interlock between said panel and said nut fastener.

19. The nut fastener and panel assembly defined in claim 18, characterized in that said second panel portion is deformed against said groove bottom wall into radial channels between said spaced protuberances and between said protuberances and said groove outer wall.

20. The nut and panel assembly defined in claim 19, characterized in that said groove bottom wall is generally flat between said protuberances and between said groove outer wall and said protuberances.

* * * * *